UNITED STATES PATENT OFFICE.

ELMER A. SPERRY, OF CLEVELAND, OHIO.

PROCESS OF MANUFACTURING ELEMENTS FOR STORAGE BATTERIES.

SPECIFICATION forming part of Letters Patent No. 713,020, dated November 4, 1902.

Application filed February 20, 1902. Serial No. 94,925. (No specimens.)

*To all whom it may concern:*

Be it known that I, ELMER A. SPERRY, a citizen of the United States, residing at Cleveland, in the county of Cuyahoga and State of Ohio, have invented certain new and useful Improvements in Processes of Manufacturing Plates or Elements of Storage Batteries, of which the following is a specification.

This invention has for its object to produce a storage plate or element wherein the ingredients forming the active material shall be homogeneous throughout; and it consists in the new and novel process hereinafter set forth.

To carry out this process, spongy or finely-divided lead is first obtained in a dry state as free as possible from superficial oxidation or association with any foreign materials, such as the sulfates, acetates, and like compounds of lead. The spongy lead may be produced from reguline lead or any of the well-known oxids of lead, lead slag, or lead scrap either by chemical precipitation or reduction, the latter method being preferred. To produce spongy lead by reduction, metallic lead or an oxid of lead is immersed in a suitable menstruum or electrolyte, whereby upon the passage of current between suitable electrodes the spongy lead will be deposited upon the cathode. Preferably the spongy lead upon its removal from the electrolyte is first washed in a bath that is slightly acidulated by sulfuric acid, after which it is again thoroughly washed in water having a decided but not strong alkaline reaction, and finally is washed in pure water. In case the lead is obtained by precipitation, however, I prefer to leave it in the bath having the alkaline reaction prior to use. The spongy lead is both washed and dried quickly by means of a rotary centrifugal machine running at a high velocity and is then spread in ovens or kept at a low temperature in thin layers until the remaining moisture is removed. Said lead is then ground or pulverized in any suitable manner and is commingled with one or more of the oxids of lead and the salt of an alkali metal, such as the sulfates or phosphates of potassium or ammonia in the proper proportions. The mass is then moistened with an alkaline hydroxid and is thoroughly mixed or stirred until it becomes of a "mealy" consistency—that is, moist, but not wet—in which form it is quickly placed upon the grid, plate, or support of the battery element and is then subjected to heavy pressure. The plates are "formed" by the action of an electric current in a suitable bath, after which they are grouped and charged in the usual manner to render them ready for use.

In making up the compound above described the proportions of sponge-lead and of the oxid or the oxids of lead may be greatly varied. The amount of the salt or salts employed also varies, as it is generally determined by the relative amount of the oxid or the oxids present, being usually only a small percentage.

A very serviceable battery plate or element may be produced by the use of from sixty to seventy per cent. of spongy or finely-divided lead, from thirty to thirty-four per cent. of the oxid or oxids of lead, and from four to eight per cent. of one of the alkaline salts.

Heretofore in the manufacture of battery plates or elements the materials comprising the active material have usually been mixed together while in a wet or moist condition. This prevents a complete and homogeneous mixture, as the particles of each ingredient tend to adhere together, so that the active material is "streaky" instead of being uniform throughout. Furthermore, when the ingredients are mixed while wet the spongy lead returns to its original or reguline condition when it is compressed, thereby seriously impairing the efficiency of the battery plate or element. According to this process the ingredients forming the active material are mixed or commingled together when thoroughly dry, so that a more intimate mixture is obtained than is otherwise possible, and the distribution of each ingredient throughout the mass of active material is absolutely uniform. The quality of the spongy lead is also maintained, as there is no tendency for this spongy lead to return to its original condition if it is mixed with the other ingredients when it is dry.

Although this process has been described somewhat in detail, yet it is obvious that various changes within the skill of one having a knowledge of the art may be made therein without departing from the spirit of the invention provided the several steps set forth in any one of the following claims be employed.

I claim as my invention—

1. The improvement herein described in the process of manufacturing storage-battery plates which consists in mixing together while dry and in a finely-divided condition lead, lead oxid, and an alkali-metal salt and then moistening said mixture with an alkaline hydroxid, as set forth.

2. The process of manufacturing storage-battery plates which consists in mixing together while dry and in a finely-divided condition lead, lead oxid and an alkali-metal salt, moistening said mixture with an alkaline hydroxid, and applying said mixture to one or to both sides of a metal support and compacting the same, as set forth.

3. The process of manufacturing storage-battery plates which consists in mixing together while dry lead, lead oxid and an alkali-metal salt in approximately the following proportions: lead sixty per cent.; oxid of lead thirty-four per cent.; salt of an alkali metal six per cent.; then adding an alkaline hydroxid until said mixture is moist, and then applying said mixture to one or both sides of a metal grid or support and compacting the same, as set forth.

In testimony whereof I sign this application, in the presence of two witnesses, this 11th day of February, 1901.

ELMER A. SPERRY.

Witnesses:
JOSEPH P. DEVINE,
PETER P. BURTIS.